(12) United States Patent
Dorsey et al.

(10) Patent No.: US 6,242,909 B1
(45) Date of Patent: Jun. 5, 2001

(54) ELECTRICAL SENSING OF VALVE ACTUATOR POSITION

(75) Inventors: Edward Dorsey, Randolph; Kevin Gardiner, Morristown; Drew LaMarca, Whippany, all of NJ (US)

(73) Assignee: ASCO Controls, L.P., Florham Park, NJ (US)

( * ) Notice: Subject to any disclaimer, the term of this patent is extended or adjusted under 35 U.S.C. 154(b) by 0 days.

(21) Appl. No.: 09/417,369

(22) Filed: Oct. 13, 1999

Related U.S. Application Data

(60) Provisional application No. 60/104,561, filed on Oct. 16, 1998.

(51) Int. Cl.[7] .................................................. G01B 7/30
(52) U.S. Cl. ............................ 324/207.25; 324/207.13; 137/556
(58) Field of Search .................. 324/207.13, 207.14, 324/207.15, 207.2–207.26, 174; 137/551, 552, 553, 554, 556; 335/206

(56) References Cited

U.S. PATENT DOCUMENTS

| | | | |
|---|---|---|---|
| 4,663,601 | * | 5/1987 | troutman et al. ............... 335/207 |
| 5,621,317 | * | 4/1997 | wozniak ...................... 324/207.13 |
| 5,777,471 | * | 7/1998 | stoll et al. ................... 324/207.25 |
| 5,957,158 | * | 9/1999 | volz et al. ........................ 137/556 |

* cited by examiner

Primary Examiner—Jay Patidar
(74) Attorney, Agent, or Firm—Levine & Mandelbaum

(57) ABSTRACT

A visual position indicator has a stator and a rotor with angularly displaced eccentricities for engaging corresponding spring biased actuators with magnets. Depending on the rotor position relative to the stator, one or more of the actuators is moved to a position whereat the field of its respective magnet can operate a magnetic switch disposed in a hermetically sealed housing. A decoder connected to the switches can produce a signal indicative of rotor position.

17 Claims, 16 Drawing Sheets

ELECTRICAL SENSING OF VALVE ACTUATOR POSITION

This application claims priority under provisional U.S. Patent Application Ser. No. 60/104,561 filed Oct. 16, 1998.

BACKGROUND OF THE INVENTION

This invention relates to a position indicator for a rotary valve actuator which is used to open or close a rotary valve, e.g., the type of indicator which is the subject of U.S. Pat. No. 5,957,158. More specifically, the invention is directed to apparatus for providing a visual and electrical indication of whether or not a rotary valve is in an open, closed, or intermediate position. Electrical indication is provided by novel means employing cams to engage spring-biased rods having magnets for actuating one or more magnetic switches.

It is known to use pneumatic and hydraulic pressure to operate a rotary valve actuator by applying fluid under pressure to a valve actuator through pneumatic or hydraulic fluid lines. For example, there is known in the art a type of rotary valve actuator having opposing pistons which are coupled to a rack and pinion mechanism for converting pneumatic or hydraulic pressure applied to the pistons to torque for opening and closing a rotary valve.

The rotary valve has a valve member which is directly connected to the output shaft of the rotary actuator and is selectively rotated into and out of the path of fluid flow between the inlet and outlet ports of a valve housing, between open and closed positions which are typically ninety degrees apart. Although the open or closed state of a rotary valve may be indirectly determined by sensing fluid pressure or flow downstream of the valve, it is desirable to have a direct indication of whether a valve is open or closed, and its exact position, independently of fluid flow through the valve. A direct indication of the operating position of a rotary valve can be provided from a visual observation of the angular position of the output shaft on the rotary valve actuator relative to a fixed reference, since the output shaft of the rotary valve actuator is directly connected to the valve member. However, often it is desirable to determine valve position from a remote location whereat the valve is not visible. The use of electric sensors on a valve to determine position has heretofore been limited due to adverse environmental effects on sensor circuitry.

SUMMARY OF THE INVENTION

The present invention overcomes the aforementioned problems of the prior art in providing a visual indicator which includes a combination visual and electrical valve position indicator. More specifically the invention provides for a position indicator having a stator with a central axis and a base, a rotor coaxially rotatably mounted on the stator, the rotor having a circumference with a plurality of angularly displaced, vertically offset, eccentricities. The rotor is provided with a plurality of stacked rings, each having one or more eccentricities on its surface. Each of the rings has an upper edge and a lower edge, there being meshing teeth on the upper edge and lower edge for removably interlocking adjacent stacked rings to prevent relative angular motion between them.

Actuators in one to one correspondence with the eccentricities are independently movably mounted relative to the base. Each one of the actuators has a cam surface engageable by a corresponding one of the eccentricities for moving the actuator to an active position when the rotor rotates to a predetermined position. Restoring springs are mounted between the actuator and the base for restoring each actuator to a rest position when the rotor rotates away from the predetermined position.

A plurality of magnetic switches in one to one correspondence with the actuators are fixedly mounted relative to the base in a hermetically sealed housing, each of the magnetic switches having a first state, e.g., open, in the absence of a magnetic field and a second state, e.g., closed, in the presence of a magnetic field. A magnet is mounted on each of the actuators for producing a magnetic field about a corresponding one of the magnetic switches thereby causing the magnetic switches to be in the second state when the actuator is in its active position, the magnetic switches being free of the magnetic field and in the first state when the actuator is in its rest position.

A decoder can be connected to each of the magnetic switches for producing a signal indicative of the position of the rotor relative to the stator.

It is therefore an object of the invention to provide an electronic indication of valve actuator position which can signal numerous positions.

Another object of the invention is to be able to change the positions of a valve actuator which can be sensed without exposing electrical sensing circuitry to the ambient environment.

Still another object of the invention is to sense valve actuator position without any mechanical linkage between the valve actuator and the sensing electronics which can cause exposure of electrical sensing circuitry to the ambient environment.

A further object of the invention is provide valve actuator position indication signals which can be applied to computer systems.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
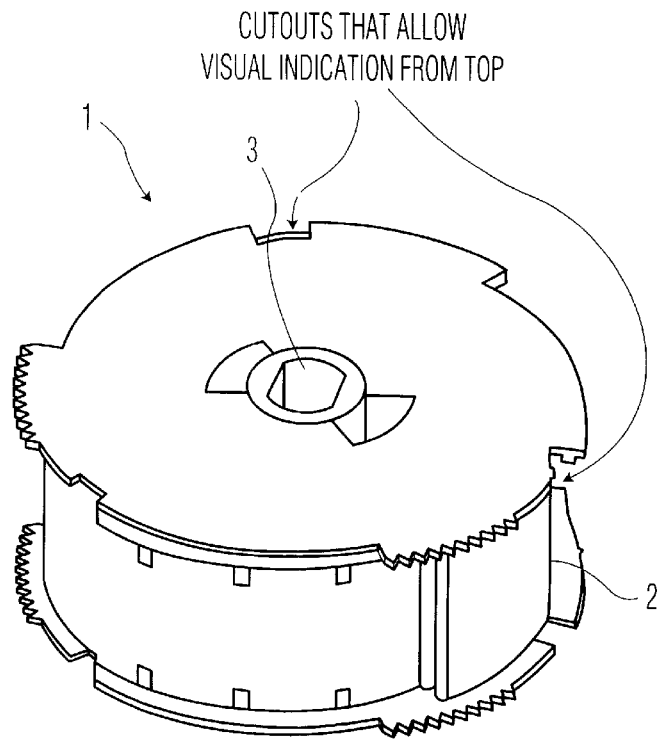
FIG. 1 is a perspective view an indicator assembly suitable for use in the preferred embodiment of the invention, in a closed position.
Figure 2:
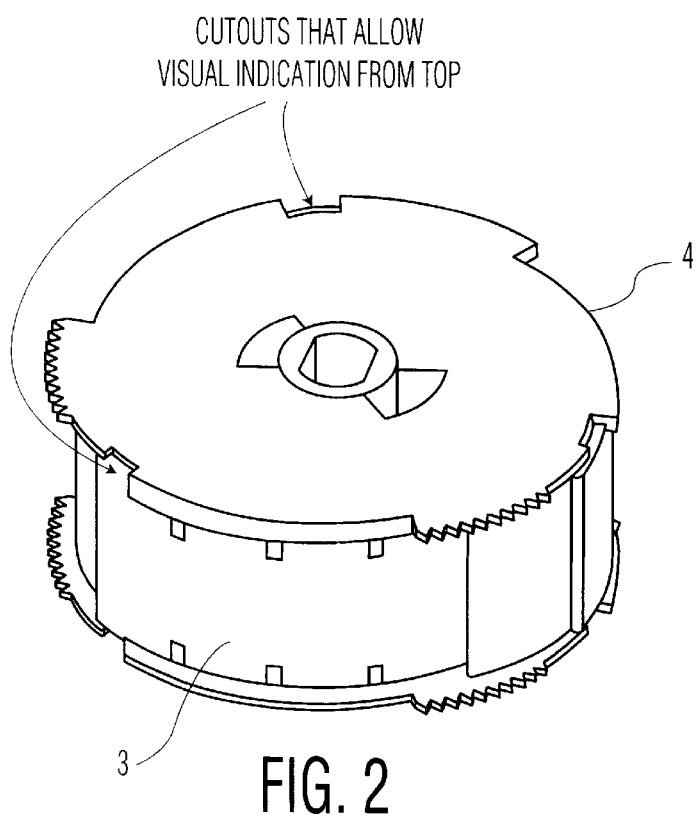
FIG. 2 is a perspective view of the indicator assembly of FIG. 1 in a disposition where the valve is open.
Figure 3:
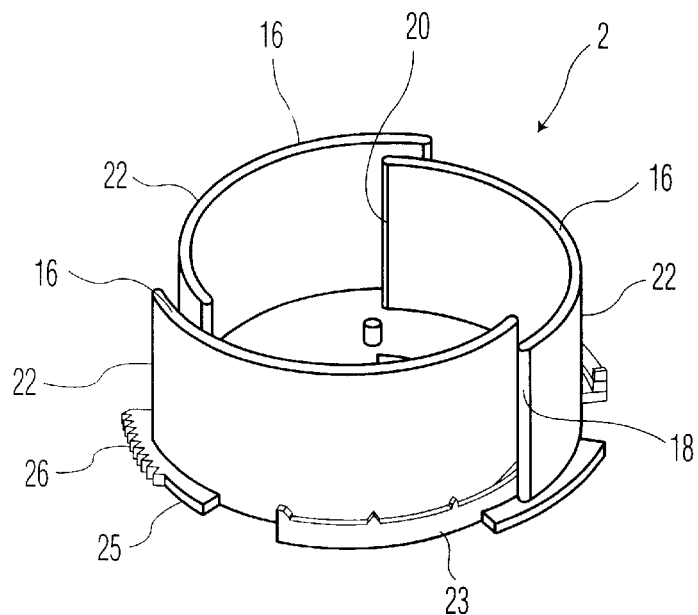
FIG. 3 is a perspective view of a stator component of the indicator assembly of FIG. 1.
Figure 4:
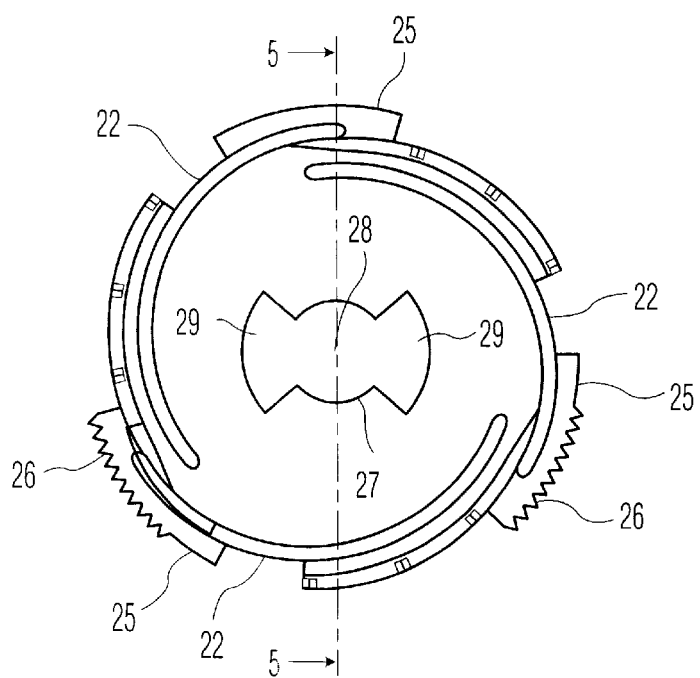
FIG. 4 is a top plan view of the stator of FIG. 3.
Figure 5:
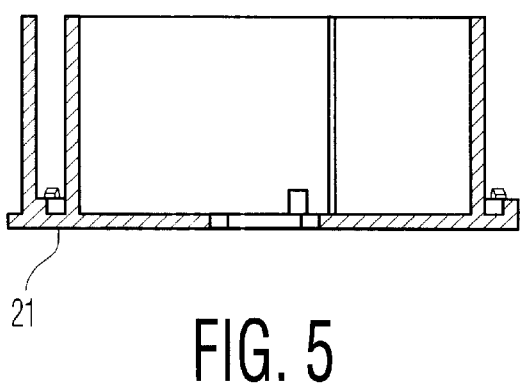
FIG. 5 is a sectional elevation view of the stator taken through line 5—5 of FIG. 4.
Figure 6:
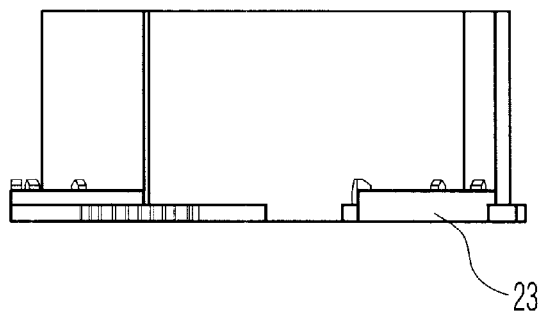
FIG. 6 is a right side elevation view of the stator of FIG. 3.
Figure 7:
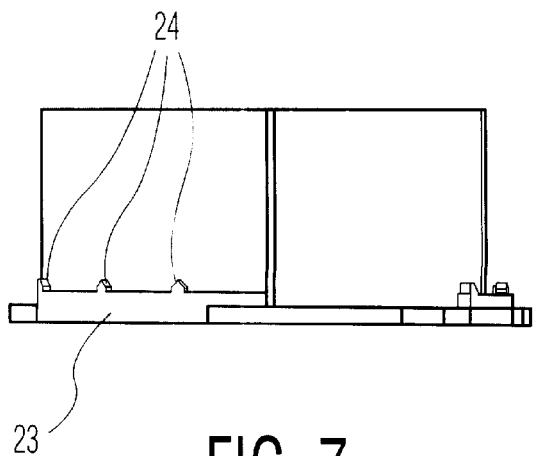
FIG. 7 is a rear elevation view of the stator of FIG. 3.
Figure 8:
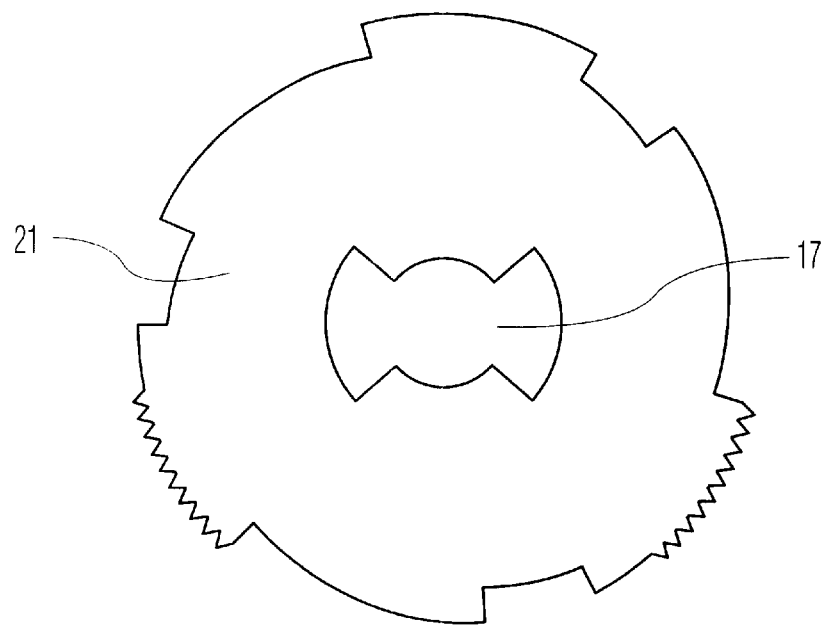
FIG. 8 is a bottom plan view of a stator of FIG. 3.

Referring now to FIGS. 1 and 2 of the drawings, an indicator 1 has a stator 2, a rotor 3, and a cover 4.

Referring additionally to FIGS. 3–8, the stator 2 has a circular base 21 with a central axis 17. Upwardly extending from the circular base 21 are three equiangularly spaced arcuate walls or volutes 22. Each stator volute 22 has a leading edge 18 and a trailing edge 20. Each stator volute's leading edge 18 is radially displaced from the axis 17 by a distance greater than the distance of its trailing edge 20 from the axis 17. On the outer surface of each of the stator volutes 22 along the base 21 of the stator 2 are three respective shoulders 23 from which index pointers 24 extend upwardly.

The apertures of the stator cover 4 and base 21 are part of a unique alignment system that allows the indicator 1 to be adjusted to allow for any misalignment of the output shaft on the rotary valve actuator that drives the indicator 1. Shaft misalignment on the rotary valve actuator is a result of dimensional variations within production or operating tolerances.

Figure 9:
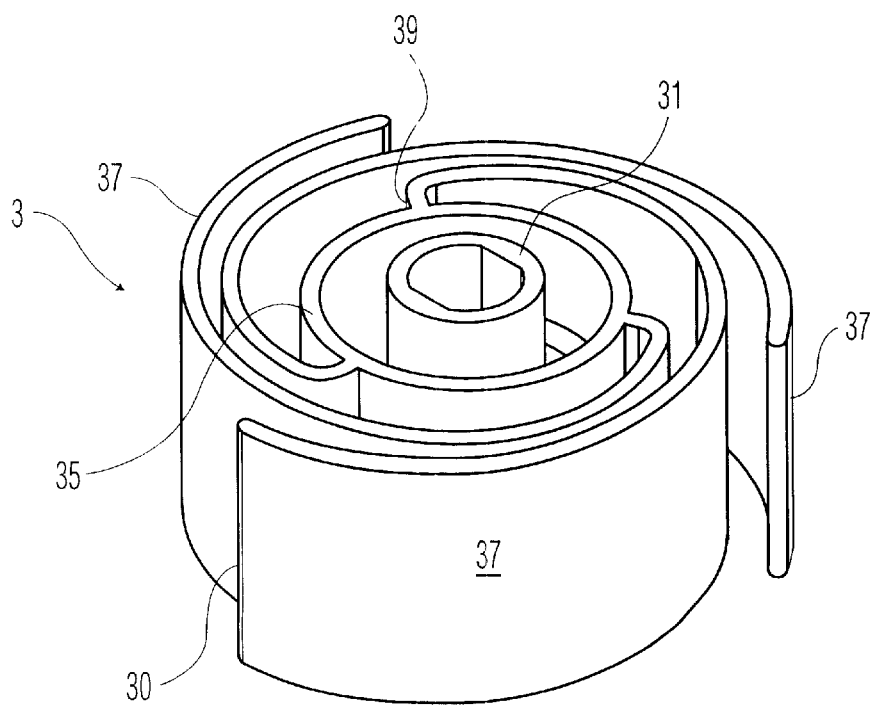
FIG. 9 is a perspective view of a rotor of the indicator assembly of FIG. 1
Figure 10:
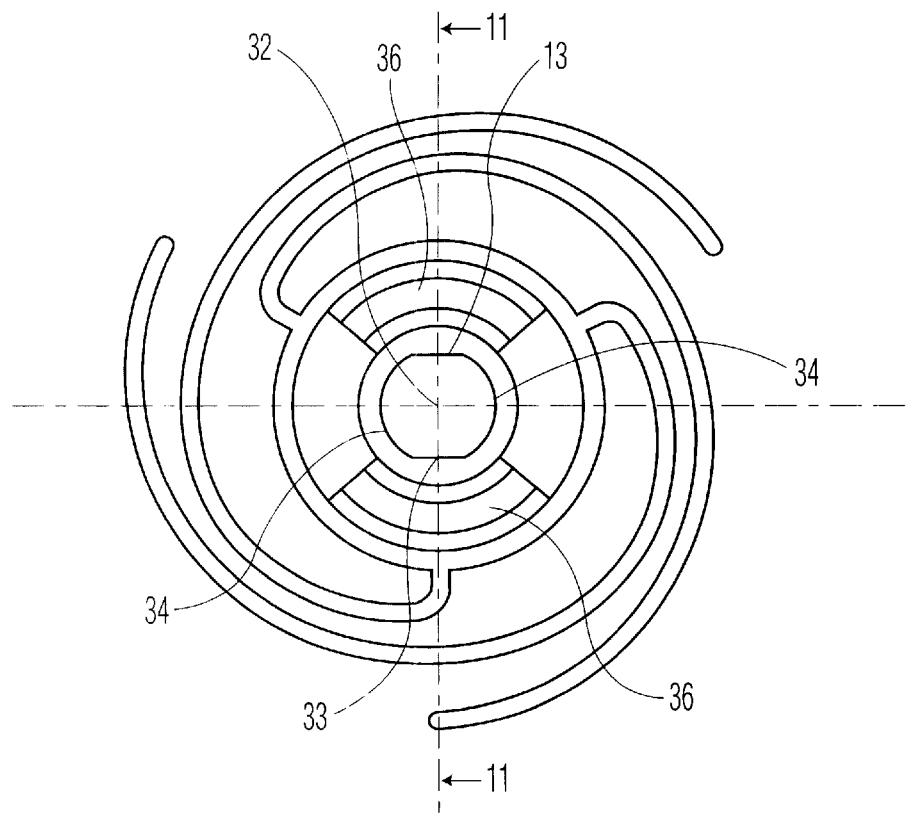
FIG. 10 is a top plan view of the rotor of FIG. 9.
Figure 11:
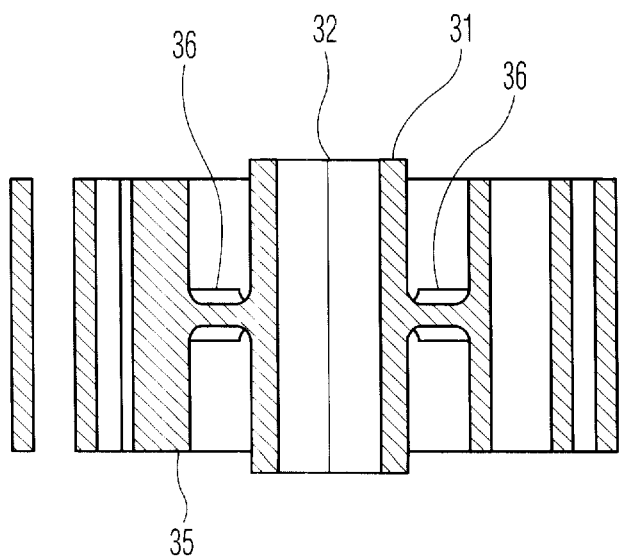
FIG. 11 is a sectional elevation view of the rotor taken through line 11—11 of FIG. 10.

Referring now to FIGS. 9–11, the rotor 3 has a hub 31 in the form of a central hollow cylinder with an axial bore 32, having straight parallel sides 33 connected by arcuate sections 34, for receiving a keyed drive shaft. The hub 31 is surrounded by a circular concentric wall 35. The hub 31 and concentric wall 35 are connected by two intermediate diametrically opposite webs 36 extending from the outer surface of the hub 31 to the inner surface of the concentric wall 35. The webs 36 are diametrically oppositely disposed with respect to the axis 32 of the rotor 3.

Connected to and extending from the outer wall of the concentric wall 35 are three equiangularly disposed arcuate walls or volutes 37. Each of the rotor volutes 37 extends radially from the outer surface of the concentric wall 35 and sharply turns inwardly so that the major length of each rotor volute is disposed along an arc approximately concentric with the axis 32 of the rotor 3. The extended length of the overlapping volutes 37 relative to the angular distance between them also serves to reduce stress upon them.

Each rotor volute 37 has a leading edge 30 and a trailing edge 39, the latter being at the intersection of each rotor volute 37 with the concentric wall 35. Each rotor leading edge 30 is radially displaced from the axis 32 by a distance greater than the distance of the trailing edge 39 from the axis 32. The rotor 3 is coaxially rotatably mounted on the stator for relative rotation between a closed position corresponding to the closed position of the output shaft on the rotary valve actuator and an open position corresponding to the open position of the output shaft on the rotary valve actuator. When so mounted, each rotor volute corresponds to one of the stator volutes 22 and has its leading edge 30 radially displaced from the axes 17, 32 by a distance less than the radial displacement of the leading edge 18 of its corresponding stator volute 22 from the axes 17, 32 and greater than the radial displacement of the trailing edge 20 of another stator volute 22, proximate to the leading edge 18 of the corresponding stator volute 22, from the axes 17, 32. The leading edge of each of the rotor volutes 37 is in radial alignment with a portion of its corresponding stator volute 22 when the rotor is in the closed position for hiding the rotor volute.

Figure 13:
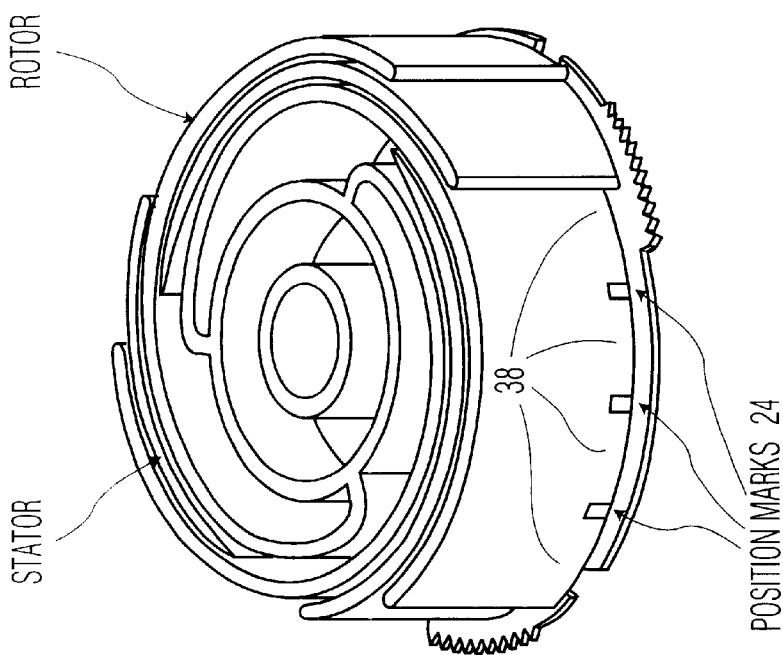
FIG. 13 is a perspective view of the indicator assembly of FIG. 1, with the cover of the apparatus removed, in a disposition where the valve is open.
Figure 12:
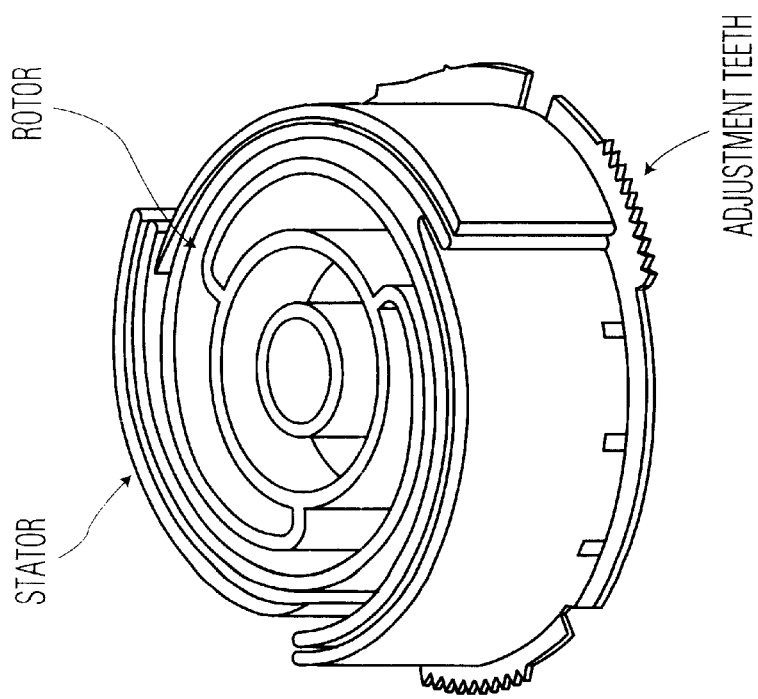
FIG. 12 is a perspective view of the indicator assembly of FIG. 1, with a cover of the apparatus removed, in a disposition where the valve is closed.

Referring now to FIGS. 12 and 13, the volutes 22 of the stator 2 and rotor 3 are positioned relative to one another so that when the rotor 3 is mounted on the stator 2, the rotor 3 can be rotated relative to the stator 2 between one position (FIG. 12) wherein each of the three volutes 37 of the rotor 3 is hidden behind a corresponding one of the three volutes 22 of the stator 2 and another position (FIG. 13) whereat the rotor volutes 37 are exposed.

The leading edge of each of the rotor volutes 37 is in radial alignment with a portion of its corresponding stator volute 22 when the rotor is in the closed position for hiding the rotor volute when viewed from a point external to the indicator along a radial line of sight to the axis 32 when the rotor is in the open position. The leading edge of each of the rotor volutes 37 extends circumferentially beyond the leading edge of its corresponding stator volute 22 for exposing the rotor volute when viewed from a point external to the indicator along a radial line of sight to the axis 32 when the rotor is in the open position. As the rotor 3 is rotated relative to the stator 2, each of the volutes 37 of the rotor 3 extends beyond an end of its corresponding stator volute 22 whereby it is visible from the exterior of the indicator 1.

The degree of extension of the rotor volutes 37 beyond the leading edges 18 of their corresponding stator volutes 22 is an indicator of the degree of rotation of the output shaft on the rotary valve actuator to open the valve, and can be measured by observing its penetration into zones 38 between the index pointers 24.

Index pointers 24 define four zones 38, three between adjacent pairs of index pointers 24, and one between a first index pointer 24 and the edge of an adjacent stator volute 22. The degree of rotation of the rotor 3 can be easily determined by observing the penetration of each of the rotor volutes 37 into the regions defined by the index pointers 24. In the preferred embodiment of the invention, the rotor 3 and stator 2 are of contrasting colors. The index pointers 24 are part of, and preferably the same color as, the stator 2 and, therefore, contrast with the volutes 37 of the rotor 3 as they extend from beyond the volutes 22 of the stator 2.

Figure 15:
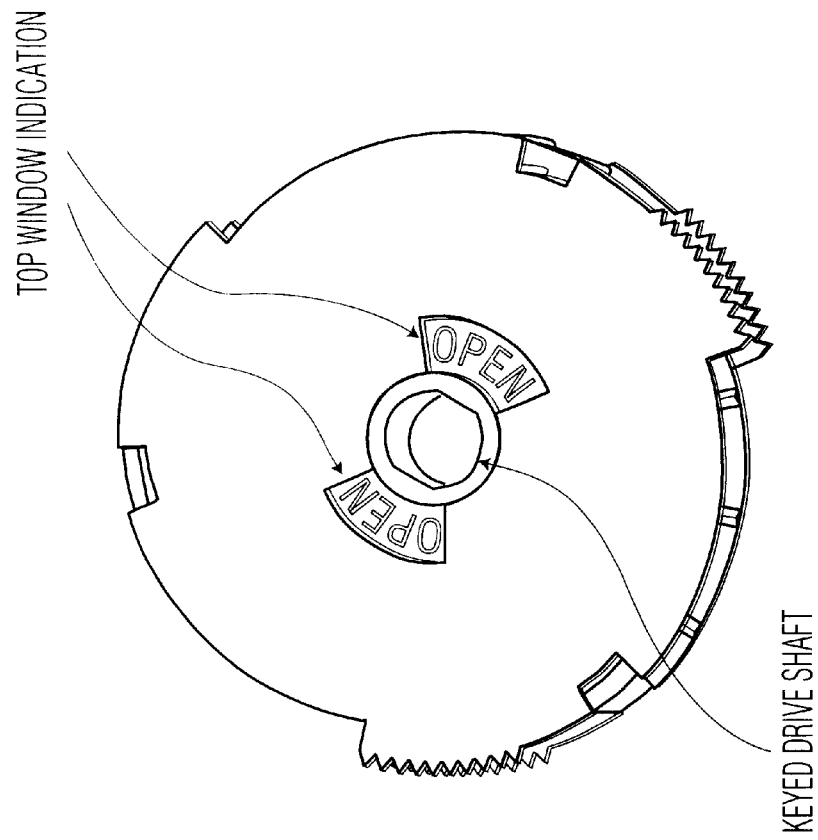
FIG. 15 is a top perspective view of the indicator assembly of FIG. 1 in a disposition where the valve is open.
Figure 14:
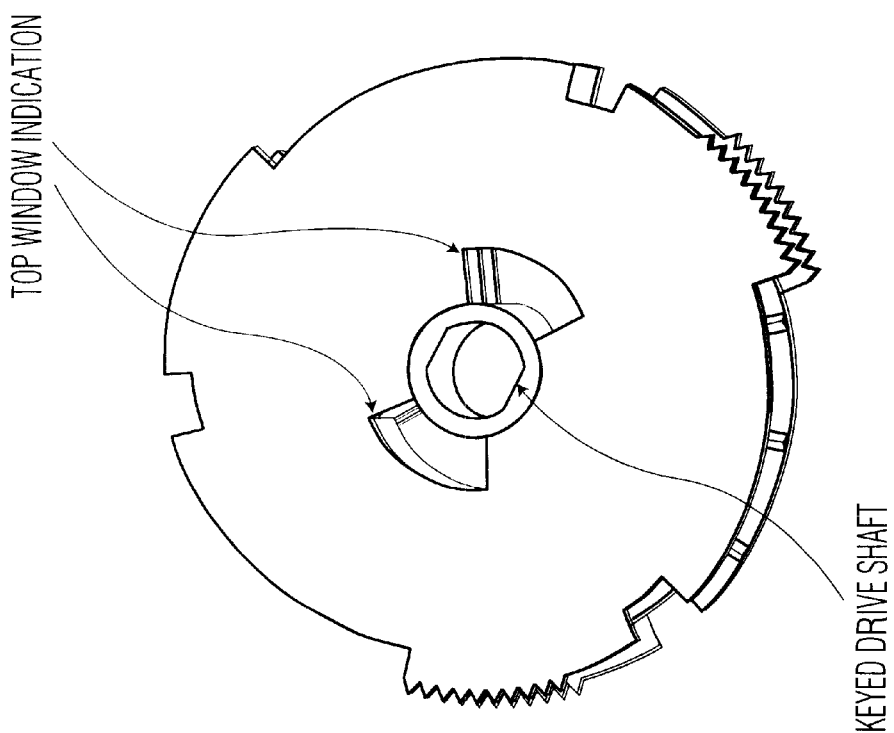
FIG. 14 is a top perspective view of the indicator assembly of FIG. 1 in a disposition where the valve is closed.
Figure 16:
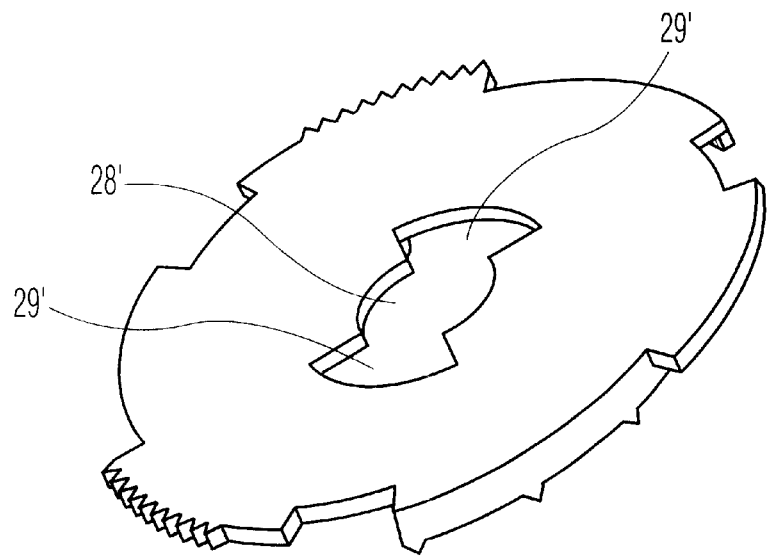
FIG. 16 is a perspective view of the cover of the apparatus of the preferred embodiment of the invention.
Figure 17:
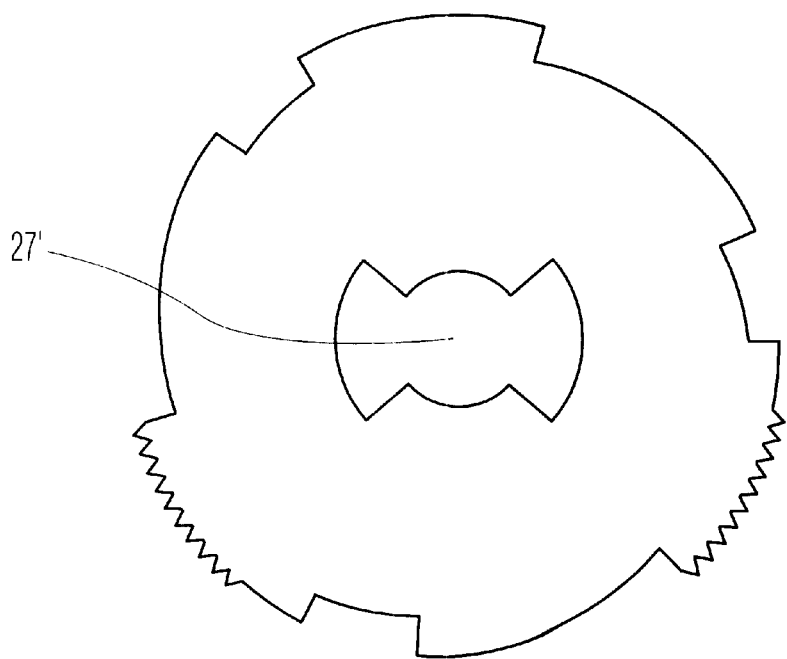
FIG. 17 is a top plan view of the cover of FIG. 16.
Figure 18:
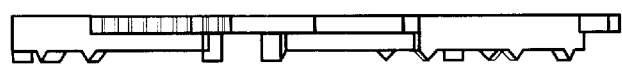
FIG. 18 is a side elevation view of the cover of FIG. 16.
Figure 19:
FIG. 19 is a rear elevation view of the cover of FIG. 16.
Figure 20:
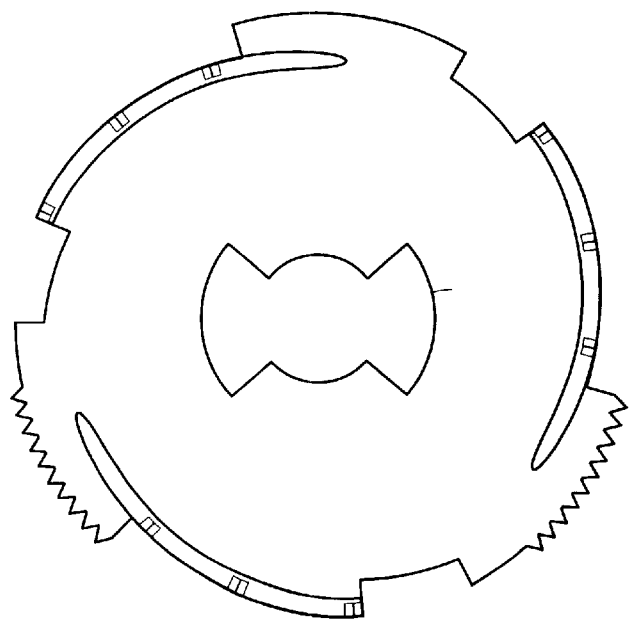
FIG. 20 is a bottom plan view of the cover of FIG. 16.

Referring again to FIG. 4 of the drawings, the base 21 has a central opening 27 in the shape of a double key hole with a central circular area 28 and diametrically opposed windows 29. As can best be seen in FIGS. 14 and 15, depending on the relative position of the rotor 3 with respect to the stator 2, the web 36 between the rotor hub 31 and the concentric wall 35 has an angular width and is positioned on the rotor 3 such that when the rotor 3 has its volutes 37 completely hidden by the volutes 22 of a stator 2, i.e., corresponding to the closed position of the valve actuator (FIG. 14), the webs 36 are out of registration with the keyhole central opening 27 in the base 21 and not visible. When the rotor 3 is rotated to a position whereat the rotor volutes 37 are maximumly extended from behind the stator volutes 22, the webs 36 are in registration with the openings in the stator base 21 and, therefore, visible through the base 21 (FIG. 15). The webs 36, being parts of the rotor 3 and of the same color as the rotor 3, are strikingly visible due to their contrast with the color of the stator base 21.

Referring now to FIGS. 16–20, the cover 4 is congruent to the stator base 21 and is mounted over the free edges 28 of the arcuate walls forming the stator volutes 22 after the rotor 3 is rotatably mounted on the stator 2. Like the base 21, the cover 4 has a central opening 27' in the shape of a double key hole with a central circular area 28' and diametrically opposed windows 29'.

The indicator 1 can then be mounted on a rotary switch actuator with either the cover 4 or the stator base 21 facing upwardly. This enables the same visual indicator 1 to be used irrespective of whether the rotary valve actuator opens by turning in a clockwise or counter clockwise direction. That is, in order to change the direction of rotation of the rotor 3 relative to the stator 2 of the indicator 1, the indicator 1 need merely be inverted before mounting on the valve actuator.

Figure 21:
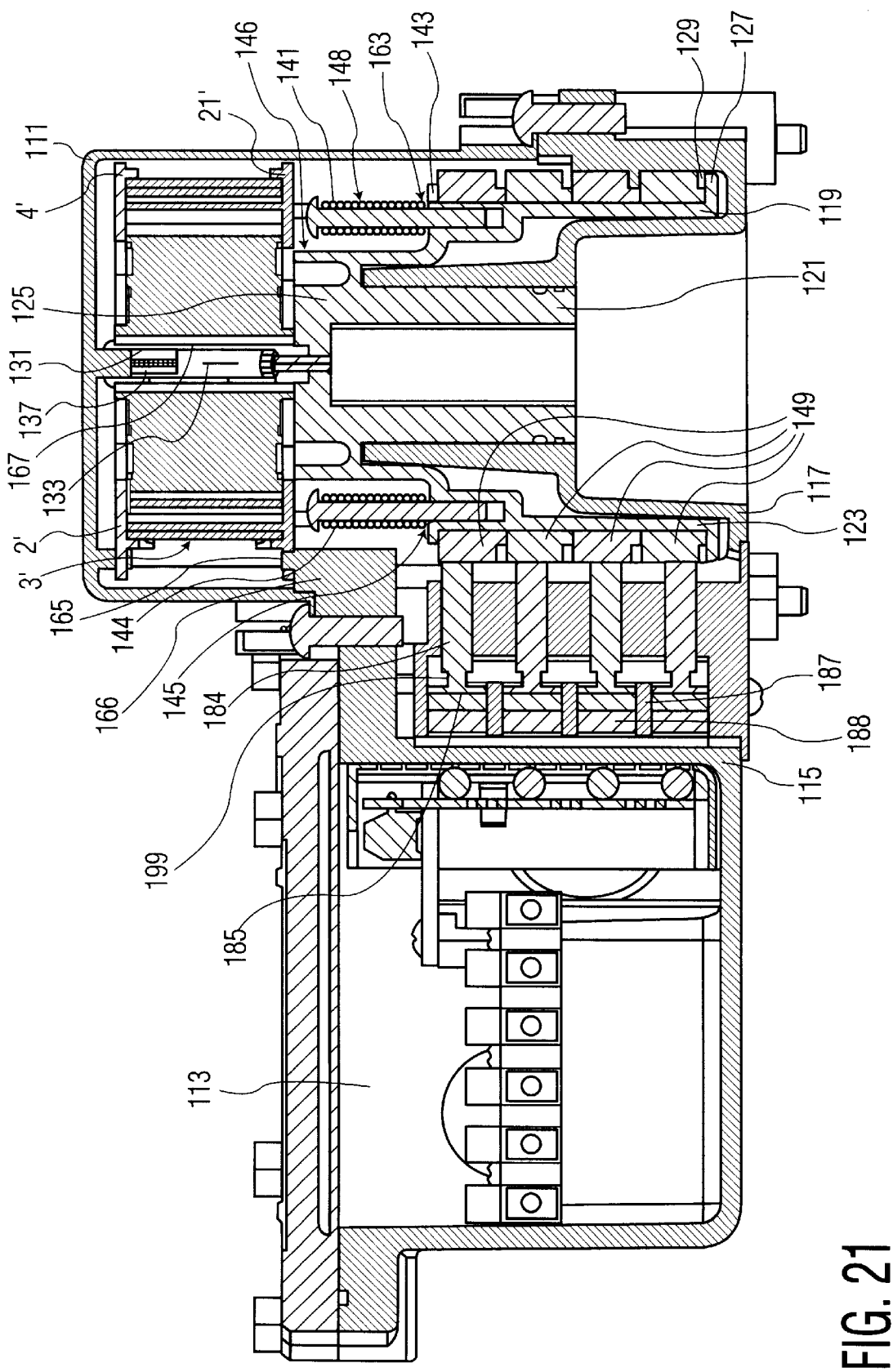
FIG. 21 is a sectional elevation view of a preferred embodiment of the invention.
Figure 22A:
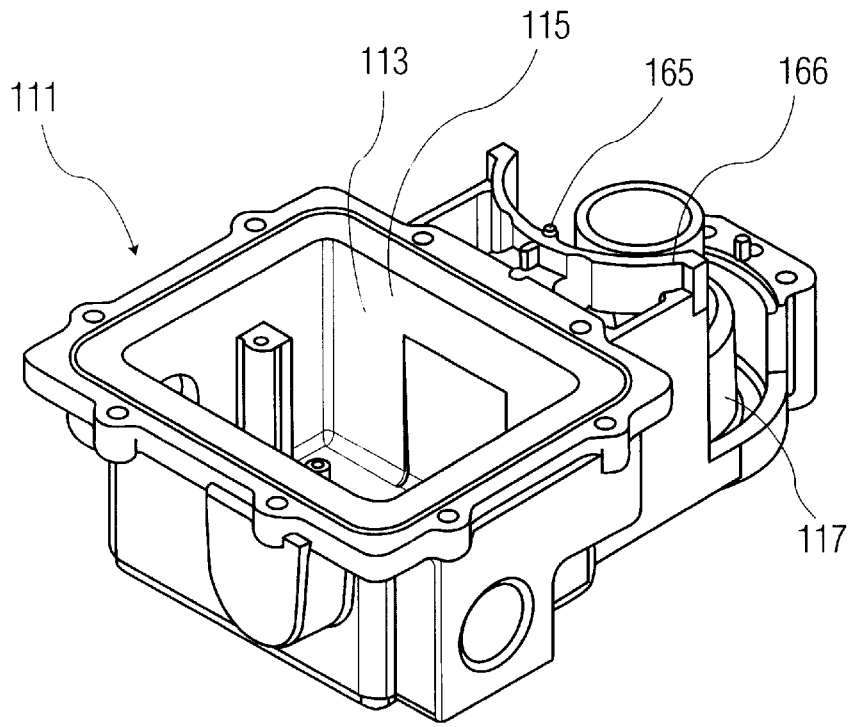
FIG. 22A is a perspective view of a combined base and housing for the invention.
Figure 22B:
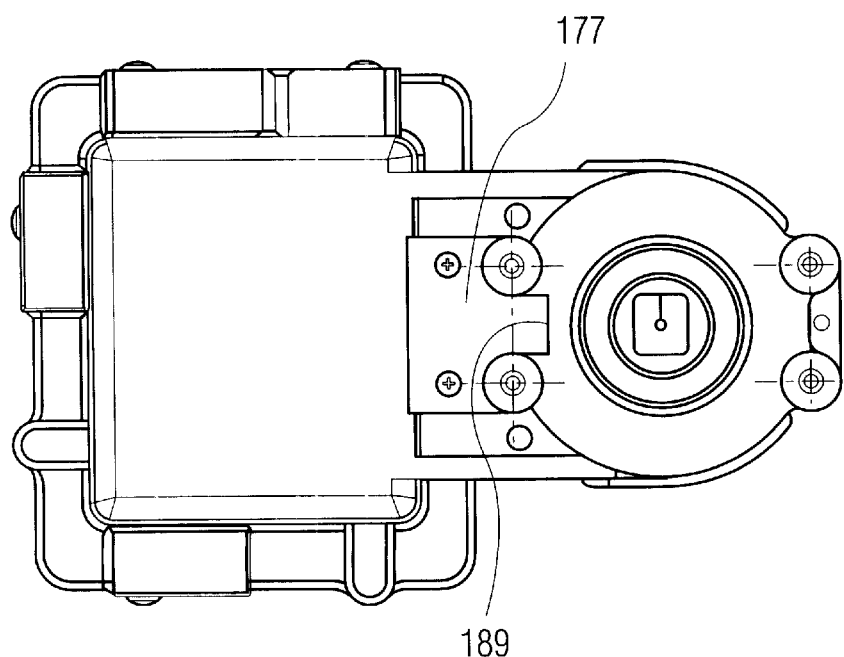
FIG. 22B is a bottom plan view of the combined base and housing of FIG. 22A.
Figure 23:
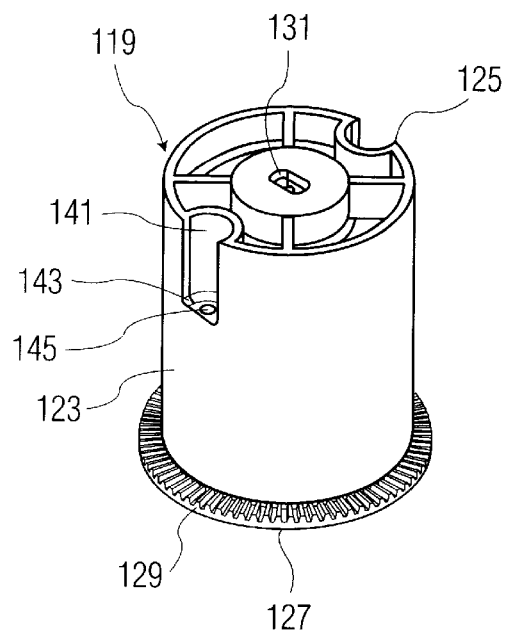
FIG. 23 is a perspective view of a rotor driver for the invention.

Referring now to FIGS. 21, 22A and 22B, a main housing 111 has a substantially rectangular cavity 113 for receiving circuitry for telemetry of indicator position to a remote site. Adjacent to a vertical wall 115 of the rectangular cavity 113, which is made of nonmagnetic material, is a stepped cylindrical boss 117. Rotatably mounted on the boss is a rotor driver 119 (see FIG. 23) having an interior cylinder 121 which is received within the bore of the boss and a coaxially spaced outer cylinder 123 which covers the boss. The inner cylinder 121 and outer cylinder 123 are connected to a common circular wall 125 atop the rotor driver 119. The inner cylinder 121 has a hollow bore, square in cross-section, for receiving a key connected to the output shaft on the rotary valve actuator so that the rotor driver 119, including inner cylinder 121 and outer cylinder 123 rotate in unison with the output shaft on the rotary valve actuator.

Figure 24:
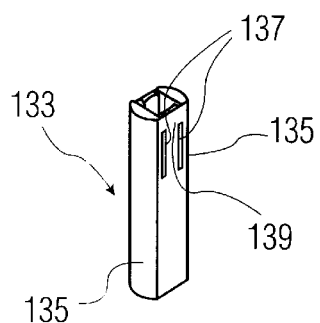
FIG. 24 is a perspective view of a rotor drive rod for the invention.

Surrounding the bottom of the rotor driver is a circular flange 127 having equally spaced teeth 129 on its upper surface. Fitted into a central axial opening 131 in the upper circular wall of the rotor driver 119, and extending upwardly therefrom, is a hollow rod 133 (see FIG. 24) which is substantially rectangular in cross-section but having two of its opposite sides 135 somewhat outwardly rounded. Longitudinal cuts 137 are formed in opposite flat sides of the rod to form resilient fingers each of which has a radially outwardly protruding barb 139.

Diametrically opposed semi-cylindrical bores 141 formed in the circumference of the upper portion of the rotor driver 119 extend downwardly from its top wall 125 and terminate in shoulders 143 in which there are threaded holes 145 for receiving screws 146.

Figure 25:
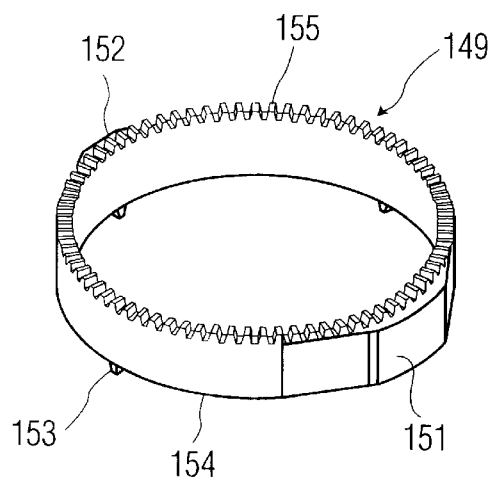
FIG. 25 is a perspective view of a cam ring for the invention.

Four identical cam rings 149 (see FIG. 25), each of which has a central circular opening with a diameter slightly larger than the outer circumference of the rotor driver, and diametrically opposite bulges 151, 152 on their outer circumferences are provided for being fitted over the rotor driver 119 in vertically stacked disposition. Each of the cam rings 149 has a bottom surface 154 with four equi-angularly separated sets of teeth 153 and an upper surface having equally spaced teeth 155 all around in a configuration congruent with the teeth on the upper surface of the flange 127 of the rotor driver 119. In the illustrated preferred embodiment of the invention, four cam rings 149 are stacked one atop another with the bottom teeth 153 of the lowermost cam ring engaging the teeth 129 on the rotor driver flange 127, and the lower teeth 153 of each other cam ring meshing with the upper teeth 155 of the cam ring 149 beneath it.

The angular position of each cam ring 149 with respect to the rotor driver 119 can be adjusted by lifting the ring, rotating it relative to the rotor driver 119, to its desired position, and then lowering the ring 149 until its bottom teeth 153 engage with the adjacent upper projecting teeth 129 (lowermost ring) or 155 (other rings).

Figure 26:
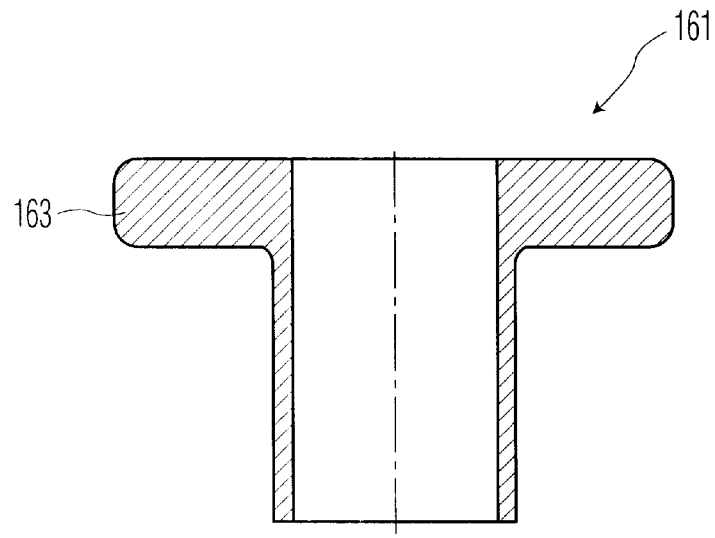
FIG. 26 is a sectional elevation view of a sleeve for the invention.

In an embodiment of the invention where four cam rings are used, each cam ring 149 has a height of one fourth of the distance from the upper surface of the rotor driver flange 127 to the shoulders 143 in the semi-cylindrical bores on the circumference of the rotor driver 119. A sleeve 161 (see FIG. 26) with a circular flange 163 is inserted into each of the two diametrically opposite screws in holes 145 so that the flanges 163 are urged against the upper surface of the uppermost cam ring 149 to secure all four of the cam rings 149 against rotational and axial movement relative to the rotor driver 119.

Figure 27:
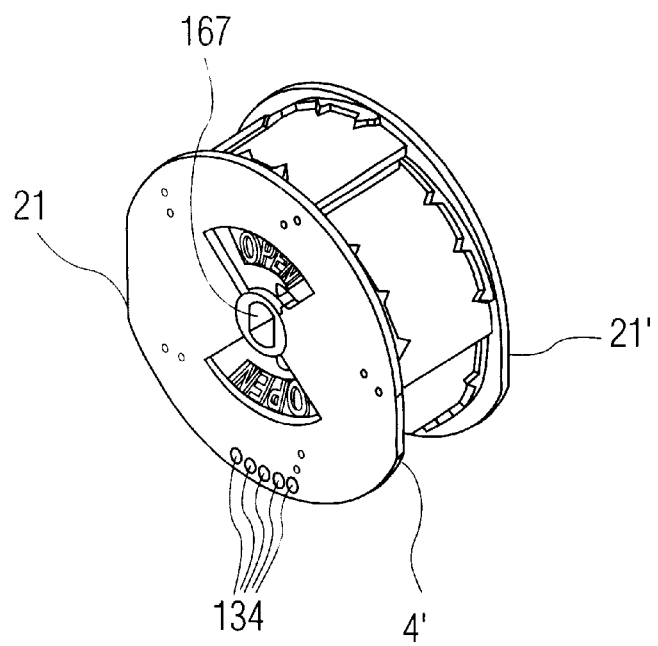
FIG. 27 is a perspective view of an indicator assembly for the invention, similar to the indicator assembly of FIG. 1.

Referring now to FIG. 27, an indicator assembly similar in construction to the one illustrated in FIGS. 1 and 2 and adapted to be mounted on main housing 111 has a stator 2'. The stator 2' has a cover 4' and a congruent base 21', each with adjacent registration apertures 164. A cylindrical pin 165 extends upwardly from an arcuate wall 166 of main housing 111, partially circumscribing the boss 117, for being received in one of the stator apertures 164 to prevent relative rotation between the stator 2' and the main housing 111 once the indicator has been calibrated by rotating the stator 2' to a desired position relative to its rotor 3' and the output shaft on the rotary valve actuator, i.e., to establish a reference position for the control valve shaft.

The rotor 3' has an axial substantially rectangular bore 167 which is congruent with the rod 133 that extends from the upper surface 125 of the rotor driver 119. The rod 133 is received within the bore 167 of the rotor 3' so that the rotor 3' turns in unison with the rotor driver 119 and the cam rings 149. The indicator assembly can be mounted in an upright or inverted position to allow for clockwise or counterclockwise operation of the valve actuator. When the rotor 3' is placed onto the rod 133, the resilient prongs formed by cuts 137 are compressed until the barbs 139 clear the uppermost surface of the rotor 3'. The barbs 139 can be squeezed together to enable removal of the rotor 3' from the rod 133.

Figure 28:
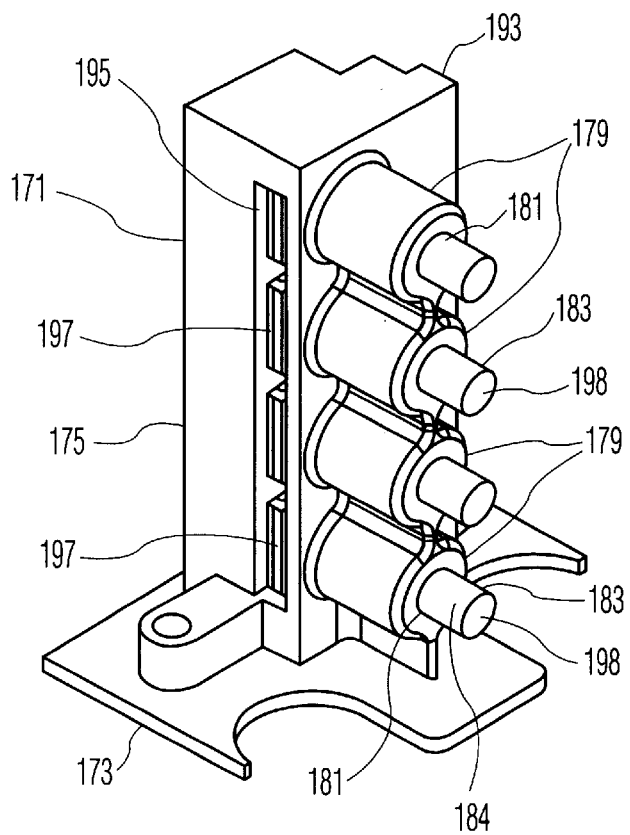
FIG. 28 is a perspective view of a plunger assembly for the invention.

Referring additionally to FIG. 28, a plunger housing 171 having a substantially flat base 173 and an upwardly extending column 175 is fitted within an opening 177 in the bottom of the main housing 111. Molded into the column 175 are four vertically aligned cylindrical bosses 179 having horizontal cylindrical bores 181 in which there are disposed four corresponding cylindrical plungers 183. Each of the plungers 183 has a solid cylindrical segment 184 proximate its respective boss 179 and an opposite end on which there is a integral square wall 185 in a plane transverse to the axis of the plunger, and from which there extend, substantially parallel to the axes of each plunger 183, two parallel spaced walls 187. Mounted between the spaced walls of each plunger 183 is a magnet assembly 188 formed from two identical axially adjacent magnets which are in like polar disposition.

Figure 29:
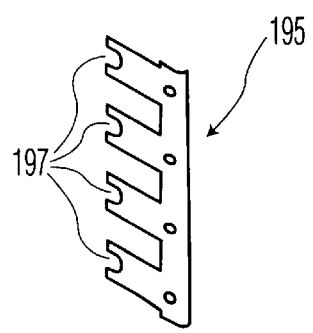
FIG. 29 is a perspective view of a leaf spring for the invention.

A vertical slot 189 is formed in the arcuate wall 166 of the housing to enable the cylindrical segments of the plungers 183 to protrude through the arcuate wall 166 for being engaged by the eccentricities 151 which form the camming surfaces of the cam rings 149. A narrow vertical slot 193 is provided in a side of the column 175 for receiving a substantially rectangular leaf spring 195 (see FIG. 29) having four parallel fingers 197.

When one of the cam rings 149 is rotated to a predetermined position, it engages one end of a corresponding plunger 183 for urging the plunger 183 horizontally in a direction away from the arcuate wall 166. Each plunger 183 has a circular groove or neck 199 for receiving an end of a leaf spring finger 197 which has a semi-circular notch. Each of four leaf spring fingers is in the form of a tine cut into a substantially rectangular sheet of spring steel. Each one of the leaf spring fingers 197 urges its respective plunger 183 toward the arcuate wall 166 and through the slot 189 for enabling a cam surface 198 on its end proximate the rotor driver 119 to be engaged by the eccentricity 151 on its respective cam ring 149.

Figure 30A:
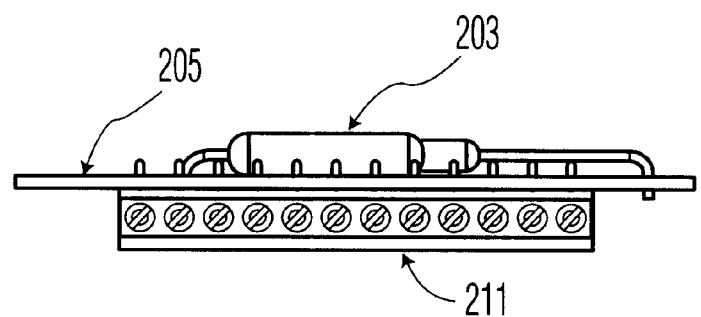
FIG. 30A is a top plan view of a switch assembly for the invention.
Figure 30B:
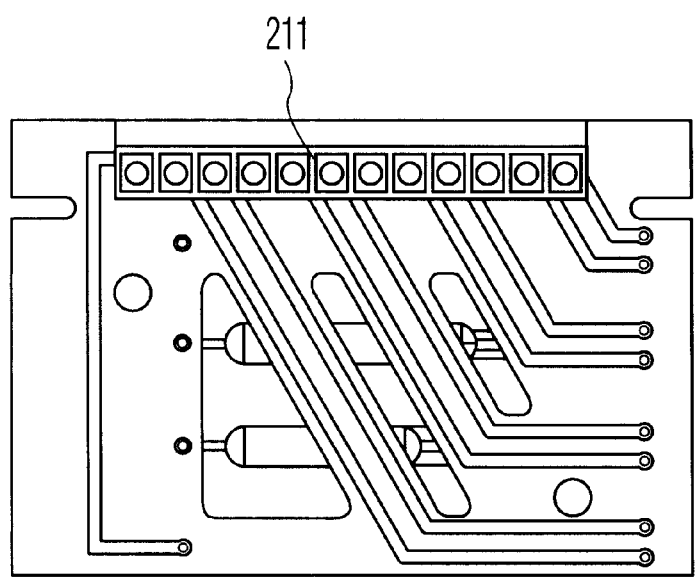
FIG. 30B is a side elevation view of the switch assembly of FIG. 30A.

Referring additionally to FIGS. 30A and 30B, four magnetically sensitive magnetic switches 203 are vertically arranged on a circuit board 205 which is mounted adjacent nonmagnetic wall 115, with the circuit board 205 in a vertical plane transverse to the axes of the plungers 183. When each plunger 183 is in a terminal position proximate its corresponding magnetic switch 203 and distal from the arcuate wall 166, the magnetic field of its permanent magnet assembly 188 actuates an adjacent one of the magnetic switches 203 thereby opening or closing a circuit, depending on whether the magnetic switch 203 is connected in a normally open or normally closed configuration, to indicate rotation of the output shaft on the rotary valve actuator to its current position. Upon further rotation of the output shaft on the rotary valve actuator and the cam rings 149 to a different position, the plunger 183 is withdrawn from its position proximate its respective magnetic switch, under force of a leaf spring finger 197. That is, the corresponding eccentricity 151 is rotated with the output shaft on the rotary valve actuator to a position which enables the plunger 183 to return toward the arcuate wall 166, and the corresponding magnetic switch 203, now free of the actuating magnetic field, returns to its normal position. An electrical terminal block 211 having twelve contacts, three connected to the contacts of each magnetic switch 203, is mounted adjacent and edge of the circuit board 205 on which the magnetic switches 203 are mounted.

Figure 31:
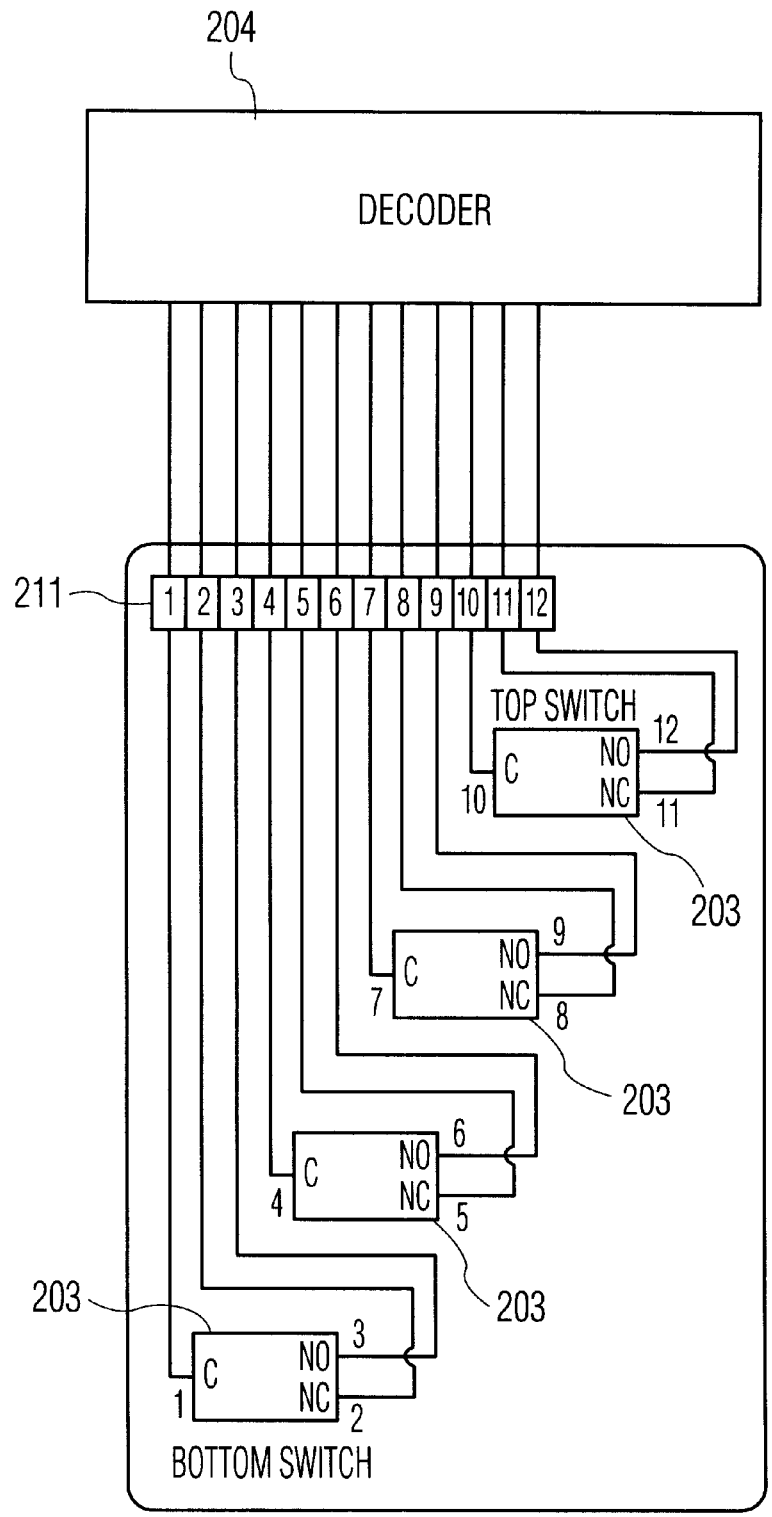
FIG. 31 is a schematic view of the switch assembly of FIG. 30A and a decoder to which the switch assembly is connected.

As can be seen in FIG. 31, each magnetic switch 203 is, preferably, a single pole, double throw switch, having three terminals, i.e., one common, one normally open, and one normally closed. The circuitry in the housing may be wired to each magnetic switch 203 for normal open or normal closed operation as can be seen with reference to FIG. 31. A decoder 204 can be connected to the switch terminals for determining from the states of the switches 203 and, hence, the position of the output shaft on the rotary valve actuator. The decoder can be connected to a telecommunications network and/or a computer (not shown) for transmitting and analyzing rotary valve actuator shaft position data.

Depending on the contour and relative dispositions of the eccentricities 151, the use of four plungers 183 and four corresponding magnetic switches 203 enables twenty-four (four factorial) different control valve positions to be indicated. For example, there may be a separate indication for each 15 degrees of rotation of the output shaft on the rotary valve actuator from the reference position.

It is to be appreciated that the foregoing is a description of a preferred embodiment of the invention to which variations and modifications may be made without departing from the spirit and scope of the invention.

What is claimed is:

1. A position indicator comprising, a stator having a base with a central axis, a rotor coaxially rotatably mounted on said stator, said rotor having a circumference with an eccentricity, an actuator member movably mounted relative to said base, said actuator member having a cam surface engageable by said eccentricity for moving said actuator member to an active position when said rotor rotates to a first predetermined position, restoration means mounted between said actuator member and said base for restoring said actuator member to a rest position when said rotor rotates away from said first predetermined position, magnetic switching means fixedly mounted relative to said base, said magnetic switching means having a first state in the absence of a magnetic field and a second state in the presence of a magnetic field, magnetic field producing means mounted on said actuator means for producing a magnetic field about said magnetic switching means thereby causing said magnetic switching means to be in said second state when said actuator member is in said active position, said magnetic switching means being free of said magnetic field and in said first state when said actuator member is in said rest position.

2. A position indicator according to claim 1 wherein said actuator comprises a plunger reciprocally mounted on said base.

3. A position indicator according to claim 2 wherein said magnetic field producing means comprises a permanent magnet mounted on said plunger, said magnet being proximate said magnetic switching means when said actuator member is in said active position and said magnet being distal from said magnetic switching means when said actuator member is in said rest position.

4. A position indicator according to claim 1 wherein said restoration means comprises a spring.

5. A position indicator according to claim 4 wherein said spring urges said actuator means toward said stator central axis.

6. A position indicator according to claim 1 wherein said base comprises a nonmagnetic wall disposed between said rotor and said magnetic switching means.

7. A position indicator according to claim 1 further comprising a hermetically closed housing in which said magnetic switching means is disposed, said housing comprising said nonmagnetic wall.

8. A position indicator comprising, a stator having a base with a central axis, a rotor coaxially rotatably mounted on said stator, said rotor having a circumference with a plurality of angularly displaced eccentricities, a plurality of actuator members in one-to-one correspondence with said plurality of eccentricities, each of said actuator members movably mounted relative to said base and to each other, each one of said actuator members having a cam surface engageable by a corresponding one of said eccentricities for moving said actuator member to an active position when said rotor rotates to a predetermined position corresponding to said one of said eccentricities, restoration means mounted between said actuator members and said base for restoring each of said actuator members to a rest position when said rotor rotates said corresponding one of said eccentricities away from its predetermined position, a plurality of magnetic switching means one to one correspondence with said actuator means fixedly mounted relative to said base, each of said magnetic switching means having a first state in the absence of a magnetic field and a second state in the presence of a magnetic field, magnetic field producing means mounted on each of said actuator means for producing a magnetic field about a corresponding one of said magnetic switching means thereby causing said magnetic switching means to be in said second state when said actuator member is in its active position, said magnetic switching means being free of said magnetic field and in said first state when said actuator member is in its rest position.

9. A position indicator according to claim 8 wherein each of said actuators comprises a plunger reciprocally mounted on said base.

10. A position indicator according to claim 9 wherein each of said magnetic field producing means comprises a permanent magnet mounted on said plunger, said magnet being proximate said corresponding magnetic switching means when said actuator member is in said active position and said magnet being distal from said corresponding magnetic switching means when said actuator member is in said rest position.

11. A position indicator according to claim 8 wherein each of said restoration means comprises a spring.

12. A position indicator according to claim 11 wherein each of said springs urges said actuator means toward said stator central axis.

13. A position indicator according to claim 8 further comprising decoder means operatively connected to each of said magnetic switching means for producing a signal indicative of the position of said rotor relative to said stator.

14. A position indicator according to claim 8 wherein said rotor comprises a plurality of coaxially stacked rings, each of said rings having one of said eccentricities.

15. A position indicator according to claim 14 wherein each of said rings has an upper edge and a lower edge, there being meshing means on said upper edge a lower edge for removably interlocking adjacent ones of said rings to prevent relative angular motion therebetween.

16. A position indicator according to claim 15 wherein each of said rings has an upper edge and a lower edge, there being meshing means on said upper edge a lower edge for removably interlocking adjacent ones of said rings with said eccentricities maintaining predetermined angular separations.

17. A position indicator according to claim 16 wherein said meshing means comprises teeth uniformly distributed about the circumferences of said upper edge and lower edge.

* * * * *